US008273525B2

(12) United States Patent
Ryu et al.

(10) Patent No.: US 8,273,525 B2
(45) Date of Patent: Sep. 25, 2012

(54) SYSTEMS AND METHODS FOR FORMING DEFECTS ON GRAPHITIC MATERIALS AND CURING RADIATION-DAMAGED GRAPHITIC MATERIALS

(75) Inventors: Sunmin Ryu, Hwaseong (KR); Louis E. Brus, Hastings, NY (US); Michael L. Steigerwald, Martinsville, NJ (US); Haitao Liu, Lansdale, PA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/770,242

(22) Filed: Apr. 29, 2010

(65) Prior Publication Data

US 2011/0062422 A1 Mar. 17, 2011

Related U.S. Application Data

(63) Continuation of application No. PCT/US2008/082070, filed on Oct. 31, 2008.

(60) Provisional application No. 60/984,246, filed on Oct. 31, 2007.

(51) Int. Cl.
*G06F 1/00* (2012.01)
(52) U.S. Cl. ......... 430/322; 257/E29.241; 257/E21.328; 257/29; 430/296; 250/492.1
(58) Field of Classification Search .................... 257/29, 257/E29.241, E21.328; 430/322, 296; 250/492.1; 438/322, 296
See application file for complete search history.

(56) References Cited

U.S. PATENT DOCUMENTS

| | | | |
|---|---|---|---|
| 5,591,312 A | | 1/1997 | Smalley |
| 5,830,539 A | * | 11/1998 | Yan et al. ................... 427/551 |
| 7,015,142 B2 | | 3/2006 | DeHeer et al. |
| 7,947,581 B2 | | 5/2011 | Ma |
| 2003/0157733 A1 | * | 8/2003 | Polanyi et al. ................ 438/1 |
| 2006/0199399 A1 | | 9/2006 | Muscat |
| 2006/0257657 A1 | | 11/2006 | Curran et al. |
| 2007/0187694 A1 | | 8/2007 | Pfeiffer |
| 2011/0042687 A1 | | 2/2011 | Chu et al. |
| 2011/0115090 A1 | | 5/2011 | Lin et al. |

OTHER PUBLICATIONS

International Search Report and Written Opinion of the International Searching Authority for PCT/US08/82070 dated Jan. 29, 2009.
U.S. Appl. No. 13/149,355, filed May 31, 2011.
U.S. Appl. No. 13/149,415, filed May 31, 2011.
"Graphene based interconnect for BEOL", (authors:disclosed anonymously), IP.com *Prior Art Database Disclosure*, Disclosure No. IPCOM000206146D, published Apr. 14, 2011, pp. 1-6.
Ding et al., "Direct growth of few layer graphene on hexagonal boron nitride by chemical vapor deposition", *Carbon*, 49(7): 2522-2525 (2011).

(Continued)

*Primary Examiner* — Jami M Valentine
(74) *Attorney, Agent, or Firm* — Baker Botts L.L.P.

(57) ABSTRACT

Systems and methods are disclosed herein for forming defects on graphitic materials. The methods for forming defects include applying a radiation reactive material on a graphitic material, irradiating the applied radiation reactive material to produce a reactive species, and permitting the reactive species to react with the graphitic material to form defects. Additionally, disclosed are methods for removing defects on graphitic materials.

19 Claims, 8 Drawing Sheets

OTHER PUBLICATIONS

Forbeaux et al., "Heteroepitaxial graphite on 6H-SiC(0001): Interface formation through conduction-band electronic structure", *Journal Physical Review*, 58(24): 16396-16406 (Dec. 15, 1998).

Jousseaume et al., "Catalytic CVD growth of nanomaterials for advanced interconnects: Si nanowires and few Graphene layers/Carbon-Nanotubes composites", *ECS Transactions*, 35(2): 35-41 (May 2011).

Lippert et al., "Direct Graphene Growth on Insulator", submitted Jun. 10, 2011, retrieved online Dec. 12, 2011 from Cornell University Library, http://arxiv.org/abs/1106.2070v1. Article first published on Aug. 31, 2011 in *Phys. Status Solidi B*, 248(11): 2619-2622.

Prével et al., "Gold nanoparticle arrays on graphite surfaces", *Applied Surface Science*, 226: 173-177 (2004).

Rümmeli et al., "Direct Low Temperature Nano-Graphene Synthesis over a Dielectric Insulator", submitted on Mar. 2, 2011, retrieved online Dec. 12, 2011 from Cornell University Library, http://arxiv.org/abs/1103.0497v1. pp. 1-13.

* cited by examiner

Applying a radiation reactive material to the surface of a graphitic material

Irradiating the applied radiation reaction active material to produce a reactive species Permitting the reactive species to react with the graphitic material to form a defect

SYSTEMS AND METHODS FOR FORMING DEFECTS ON GRAPHITIC MATERIALS AND CURING RADIATION-DAMAGED GRAPHITIC MATERIALS

CROSS-REFERENCE TO RELATED APPLICATIONS

The present application is a Continuation of International Patent Application Serial No. PCT/US2008/082070, filed Oct. 31, 2008, which claims priority to U.S. Provisional Application Ser. No. 60/984,246, filed Oct. 31, 2007, the entirety of the disclosures of which are explicitly incorporated by reference herein.

STATEMENT REGARDING FEDERALLY SPONSORED RESEARCH

The disclosed subject matter was made with government support under Grant No. DE-FG02-98ER14861, awarded by the Department of Energy. The government has certain rights in the disclosed subject matter.

BACKGROUND

Thin graphitic films are considered as promising electronic materials due to exceptional heat and electrical conductance within the graphite layers. However, their application in electronic devices can be limited by the fact that graphitic materials are notoriously difficult to pattern because of their chemical inertness. Moreover, patterning requires that they not only react, but react in a spatially-resolved manner.

Another impediment to any patterning process is that damage often occurs during the deposition and etching of the active material. Therefore, many patterning processes require a damage-repair step. In the same way that etching of graphite materials is difficult, the repair of defects in the material is difficult because damaged graphite is still chemically refractory.

Although defects are often deleterious to the electrical behavior of electronic materials, they can be beneficial for the processing of such materials. For example, defects can be used as initiation sites for further etching or chemical surface modification of the graphitic material. Further, if the areas containing such defects can be made in a spatially-resolved manner, they would serve as a blueprint for a component in electric circuitry.

Therefore, it would be desirable to have a simple way to form spatially-resolved defects on the surface of graphitic materials. It would also be desirable to remove defects in graphitic materials in a spatially-resolved manner.

SUMMARY

The disclosed subject matter provides techniques for forming and removing spatially resolved defects on graphitic material. In one embodiment, the disclose subject matter provides a method including applying a radiation reactive material to at least a portion of a surface of graphitic material, irradiating the reactive material to produce a reactive species therein, and permitting the reactive species to react with the graphitic material to form at least one defect therein.

In some embodiments, electromagnetic radiation can be used for irradiating the applied radiation reactive material, and one or more electron beams can be used for the irradiation. The graphitic material can be graphene, and stacked as multiple layers.

In some embodiments, the radiation reactive material can be a halogen molecule, such as fluorine, bromine, chlorine, and/or iodine. Alternatively, the radiation reactive material can be a peroxide compound, poly(methyl methacrylate), or hydrogen silsesquioxane. In some embodiments, the reactive species can be a radical.

In some embodiments, the method further includes forming a geometric pattern of a plurality of defects, at least a section of the geometric pattern having a resolution of about 15 nm.

According to another aspect of the disclosed subject matter, a method for removing defects on a graphitic material is provided. The method includes irradiating an area on the graphic material containing the defects using electromagnetic radiation to cause a reduction of the defects.

According to a further aspect of the disclosed subject matter, a device incorporating one or more defects on a graphitic material is provided. The one or more defects incorporated are formed by a method that includes applying a radiation reactive material to at least a portion of a surface of said graphitic material, irradiating said radiation reactive material to produce a reactive species therein, and permitting said reactive species to react with at least said portion of said surface of said graphitic material to thereby form at least one defect therein.

The accompanying drawings, which are incorporated and constitute part of this disclosure, illustrate preferred embodiments of the disclosed subject matter and serve to explain the principles of the disclosed subject matter.

BRIEF DESCRIPTION OF THE DRAWINGS

Further features of the disclosed subject matter, its nature, and various advantages will be more apparent from the following detailed description of the preferred embodiments and the accompanying drawings, wherein like reference characters represent like elements throughout, and in which.

DETAILED DESCRIPTION

Figure 1:
FIG. 1 is a block diagram illustrating an exemplary method for forming defects on graphitic materials according to some embodiments of the disclosed subject matter.
Figure 1:

Techniques for forming and removing defects on the surface of graphitic materials, and devices formed from the application of such techniques, are provided herein. Referring to FIG. 1, an exemplary method for forming defects in graphitic materials according to some embodiments of the disclosed subject matter will be explained. A radiation reactive material is applied 101 to the graphitic material. The applied radiation reactive material is irradiated 102 to produce a reactive species. The reactive species reacts with the graphitic material 103 to form defects on the surface of the graphitic material.

Applications of the disclosed subject matter include the fabrication of field effect transistors, and the modification of the electrical characteristics of graphitic material used within such devices.

In accordance with the disclosed subject matter, the term "graphitic material" as used herein includes graphene, which is a one-atom-thick generally planar sheet of carbon atoms where the carbon atoms are sp2-bonded. It also include a stacked multiple layers of graphene, such as those in graphite. It further includes the fullerene family of carbon allotropes, including C-60 spherical fullerenes and carbon nanotubes. The "surface of the graphitic material" refers to the carbon atomic layer that is in contact with the radiation material applied thereon.

The term "radiation reactive material" used herein refers to a material which, upon irradiation, produces a reactive species therein, which can further reacts in the graphitic material to form a defect. Accordingly, the radiation reactive material used herein depends on the types of irradiation being utilized.

In one embodiment of the disclosed subject matter, the irradiation is electromagnetic radiation, e.g., light in the ultraviolet, visible, infrared, far infrared, and/or other wavelength ranges of the spectrum. The wavelength of the electromagnetic radiation can be in the range of 200 to 1500 nm. The source of the electromagnetic radiation can be a laser. Additional elements can be employed to change the properties of the radiation, e.g., to achieve narrower band-width or higher intensity.

In another embodiment, the irradiation is in the form of electrons in one or more electron beams. The electrons can be generated by a device such as an electron beam generator or an electron gun. For example, the electron beam generators commonly used in electron beam (e-beam) lithography can be utilized as the electron source.

When the electromagnetic radiation is used, the radiation reactive material can be a substance which includes molecules that undergoes a chemical reaction to release a reactive species under irradiation. One such chemical reaction is molecular dissociation.

In one embodiment, the radiation reactive material includes halogen molecules, i.e., fluorine, chlorine, bromine or iodine. Halogen molecules can be adsorbed onto the surface of the graphitic material from the vapor phase. The adsorption can result in a partial monolayer, a full monolayer, or a multiple layers of the halogen molecules on the surface of the graphitic material, depending on the experimental condition. The adsorbed halogen molecules can then be irradiated, e.g., with a laser.

The wavelength of the laser depends on the halogen molecule adsorbed. Generally, the laser should have a wavelength of less than 650 nm, and a power density of greater than 10 W/cm$^2$. In some arrangements of the disclosed subject matter, the wavelength is greater than 350 nm but less than 550 nm, and the power density greater than 1000 W/cm$^2$.

The irradiation induces dissociation of the halogen molecules into a reactive species, i.e., halogen atoms (a radical), or the reactive equivalents thereof. The reactive species then react with atomic carbon in the surface of the graphitic material to form defects. It is believed that the produced reactive species (in this case, halogen atom) make covalent bonds with the carbon atoms lying on the surface of the graphitic material. This creates defects on the surface of the graphitic material.

As used herein, the term "defect" refers to a disruption of the normal structure of the surface atomic layer of the graphitic material. In the case of graphene, it refers to a disruption of the ideal extended π-bonded network. This can be caused by a changed bonding state of the sp2-bonded carbons in the graphene, such as breaking of a C—C bond, the change of conjugation of a C—C bond, and/or a changed hybridization state of a carbon atom (from sp2 to sp3 hybridization). The singular form "defect" refers to such a change occurring on one of the carbon atoms on the surface of the graphitic material. It is believed that the defects not only alter the physical property of the surface of the graphitic material, but can also "dope" the surface and provide functional groups for further chemical modification.

In another embodiment, peroxide molecules are adsorbed onto the surface of the graphitic material and the sample is irradiated with light. Similarly to the case of halogen molecules, the radiation induces photochemical and/or thermal reactions between the adsorbed peroxide molecules and the surface of the graphitic material. Generally, the light should be of a wavelength shorter than 1400 nm, and a power density of greater than 1 mW/cm$^2$.

In some arrangements of the disclosed subject matter, the wavelength should be smaller than 600 nm but greater than 150 nm, and the power density greater than 1000 W/cm$^2$. In a specific embodiment, the peroxide molecule is benzoyl peroxide. It is believed in this case the reactive species produced is phenyl radical or the reactive equivalents thereof.

In some embodiments, one or more electron beams are utilized for irradiating the radiation reactive material. Because of the very small spot size of the electron beam in an e-beam lithography equipment, using an electron beam can achieve a resolution not achievable by conventional optical lithography techniques. Accordingly, certain electron beam resists which can produce a reactive species upon e-beam irradiation can be used as the radiation reactive material in the disclosed subject matter.

In one embodiment, the radiation reactive material is poly (methyl methacrylate) (PMMA). In another embodiment, the radiation reactive material is hydrogen silsesquioxane (HSQ). To use electron beam lithography, a thin film of radiation reactive material with a thickness of e.g., 20 nm-1 micron, can be applied by any appropriate methods, such as spin-coating or similar processes, onto the surface of a graphitic material. Then, electron beam lithography can be used to irradiate an area of interest.

When the radiation reactive material of the disclosed subject matter is bombarded by the electrons from the electron beam, a chemical reaction is induced and a reactive species is produced therein. In the case of HSQ, this involves the scission of Si—H bond (which initiates cross-linking) which generates the hydrogen atoms which are believed to be the major reactive species that migrate to the surface of the graphitic material and react with it to form defects. In the case of PMMA, the polymer is broken down by the electron beam into fragment radicals, which are believed to be the reactive species that react with the graphitic material to form defects.

A geometric pattern of defects can be created by scanning the electron beam across an area of interest on the graphitic material with applied radiation reactive material thereon. The resolution of the pattern depends on the spot size of the electron beam, the scattering in the radiation reactive material, and the diffusion distance of the reactive species within the radiation reactive material in its life-time. Therefore, the radiation reactive material used and the thickness of the radiation reactive material applied are relevant factors. When using HSQ as the radiation material with a film thickness of about 20 nm, an approximately 15 nm resolution of the pattern of defects can be achieved. Similar techniques can be used to pattern graphitic materials using electromagnetic radiation and the appropriate radiation reactive material. However, the resolution of patterns containing defects formed by laser light and the corresponding radiation reactive material is usually limited by half of the wavelength of the light employed, i.e., on the order of 200~300 nm.

As used herein, the term "resolution" refers to the smallest dimension of an area containing such irradiation-induced defects that are bound by the defect-free areas on the surface of the graphitic material.

It can be appreciated by those skilled in the art that the density of the defects formed using the methods in the disclosed subject matter can be varied by changing the experimental parameters such as the radiation reactive material applied, the thickness of the radiation reactive material, the types of irradiation used, and the irradiation time, among other things. When the density of defects reaches a sufficient level in a given area, the electric conductivity of the area can drop to that of an insulating material. Also, when the defects formation involves breaking of C—C bonds on graphene, high concentration defects can lead to a "hole" in the top graphene layer where the carbon atoms are removed, and defects can occur on the second graphene layer (if a stacked multiple layers of graphene are used). Therefore, the methods described above can be used to pattern areas of different electrical conductivity (or electric insulation), thereby creating functional nanoscale electronic devices. Other useful applications based on the altered chemical reactivity of the patterned area containing defects (because of the attachment of the reactive species onto the surface of the graphitic material) also fall within the scope of the disclosed subject matter.

In another embodiment, a method of removing graphitic material having irradiation-induced defects is disclosed. In this method, electromagnetic radiation, e.g., visible laser light, can be used to irradiate an area on the graphic material containing the defects to cause a reduction of the defects. The mechanism of such "healing effect" is believed to be related to the photothermal effect of the laser light. Even though ovens can be used to achieve a similar effect, using a laser light beam can selectively repair defects in micro-regions of interest. Generally, the wavelength of the laser light used herein should be shorter than 1500 nm, preferably between 350 nm to 600 nm, and a power density of greater than 1000 W/cm$^2$.

EXAMPLES

The present disclosed subject matter will be better understood by reference to the following examples, which are provided for illustrating some aspects of the disclosed subject matter, and not by way of limitation.

Example 1

Example 1 illustrates forming defects on a graphitic material using bromine as the radiation reactive material. A single layer graphene flake (10 μm in diameter) was mechanically exfoliated onto an oxidized silicon substrate. The graphene flake was then exposed to bromine vapor for ten minutes and irradiated with 514 nm laser light for ten minutes at a power density of 300 kW/cm$^2$.

Figure 2:
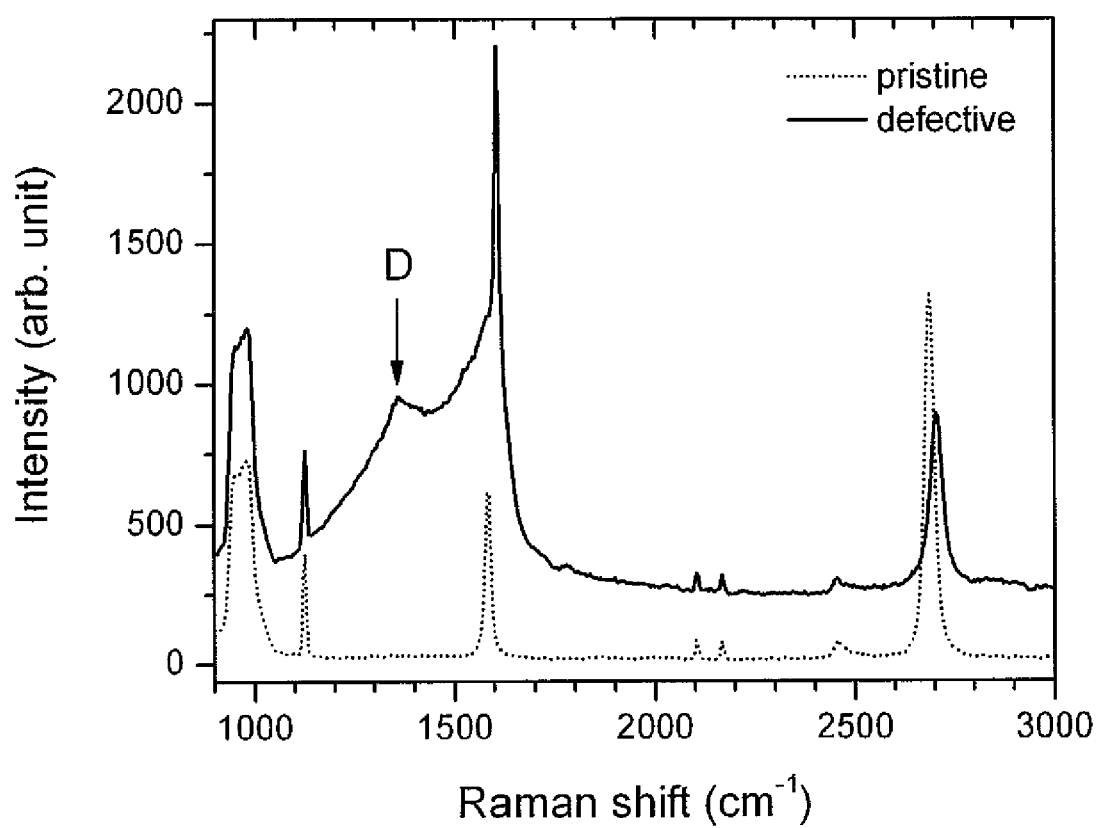
FIG. 2 depicts a Raman Spectrum of pristine graphene and an area of graphene containing defects according to some embodiments of the disclosed subject matter.

FIG. 2 depicts a Raman Spectrum of pristine single layer graphene as well as that of an area of graphene containing defects formed using the above method. The Raman spectrum shows a prominent defect-derived band (denoted D) near 1350 cm$^{-1}$. This is characteristic of a disruption of the ideal graphitic order. The pristine crystalline graphene lacks this band.

Example 2

Example 2 illustrates forming defects on a graphitic material using benzoyl peroxide. A single layer graphene flake was mechanically exfoliated onto an oxidized silicon substrate. The graphene flake was then immersed in 20 mM benzoyl peroxide solution in toluene and irradiated with 514 nm laser light for ten minutes at a power density of 200 kW/cm$^2$. A commercial microscope Nikon Eclipse TE300 was used to focus the laser light into a 1 micron sized spot.

Figure 3:
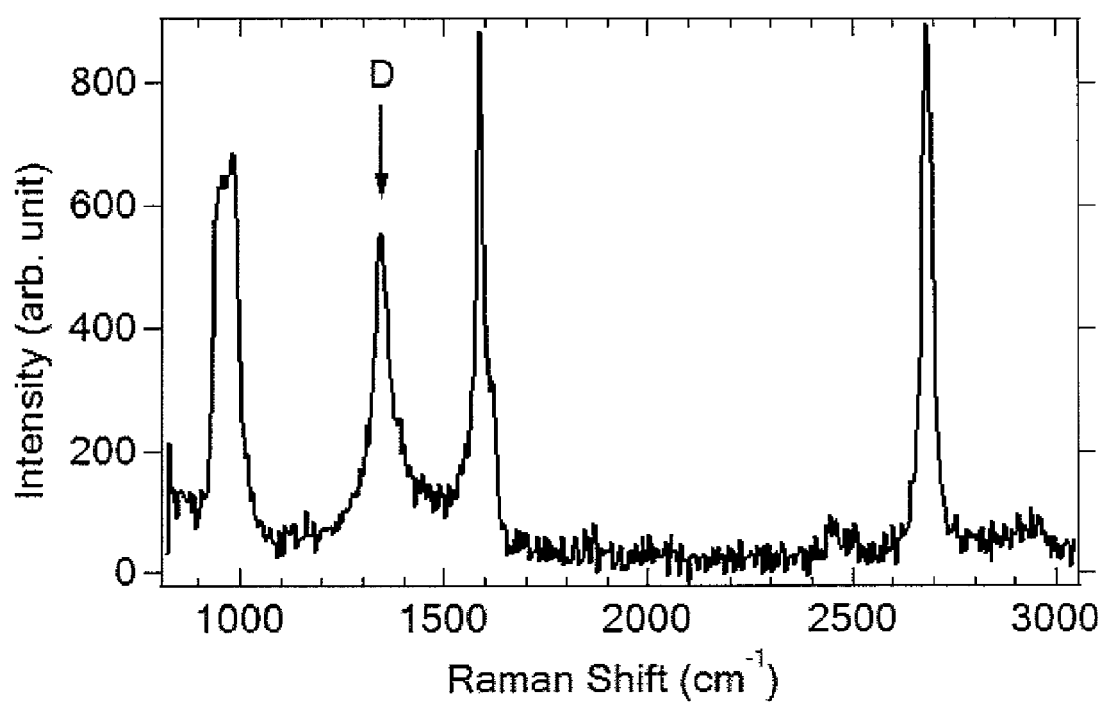
FIG. 3 depicts a Raman Spectrum of an area of graphene containing defects according to some embodiments of the disclosed subject matter.

FIG. 3 depicts a Raman Spectrum of an area of graphene containing defects formed by the above method. Similar to the Raman spectrum shown in Example 1, this Raman spectrum also shows a prominent defect-derived band near 1350 cm$^{-1}$ (denoted D), indicating a disruption of the ideal graphitic order.

Example 3

Example 3 illustrates forming defects in a graphitic material using HSQ as the radiation reactive material and e-beam lithography for irradiation, as well as repairing the defects so formed using a visible laser light.

Figure 4:
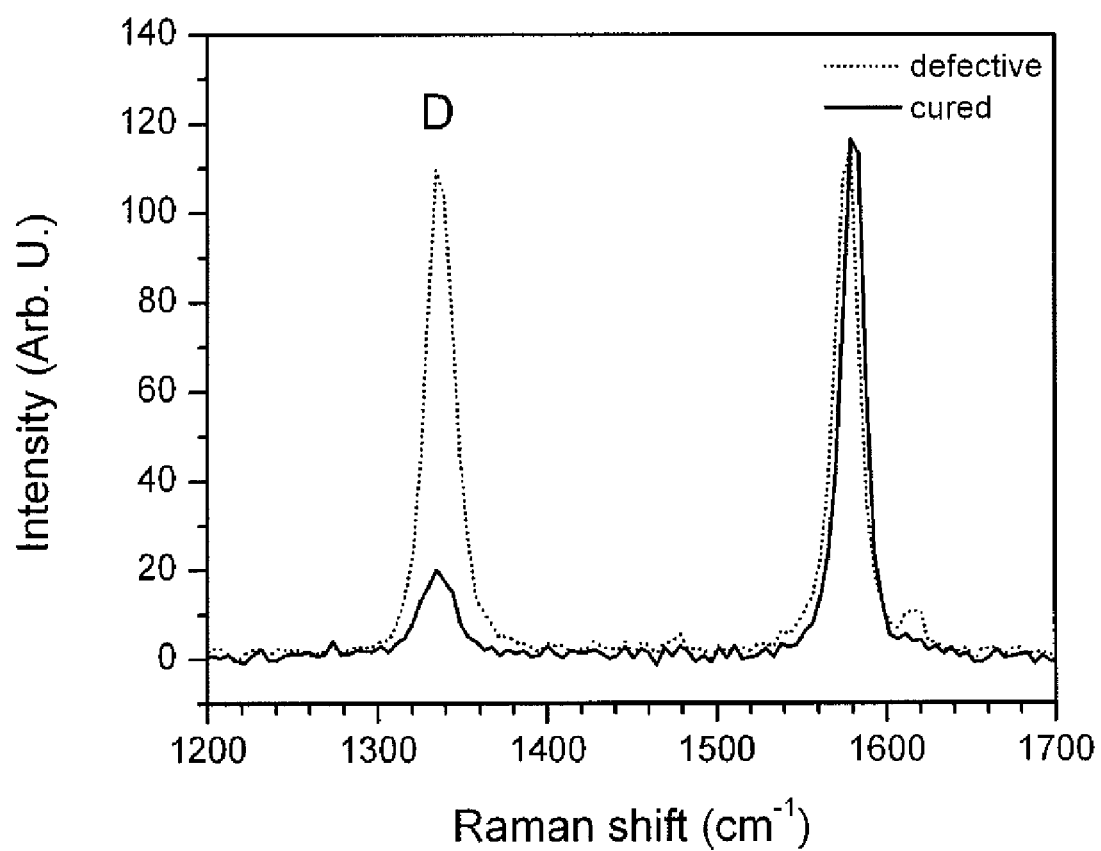
FIG. 4 depicts a Raman Spectrum of an area of graphene containing defects and partially cured defects according to some embodiments of the disclosed subject matter.
Figure 5:
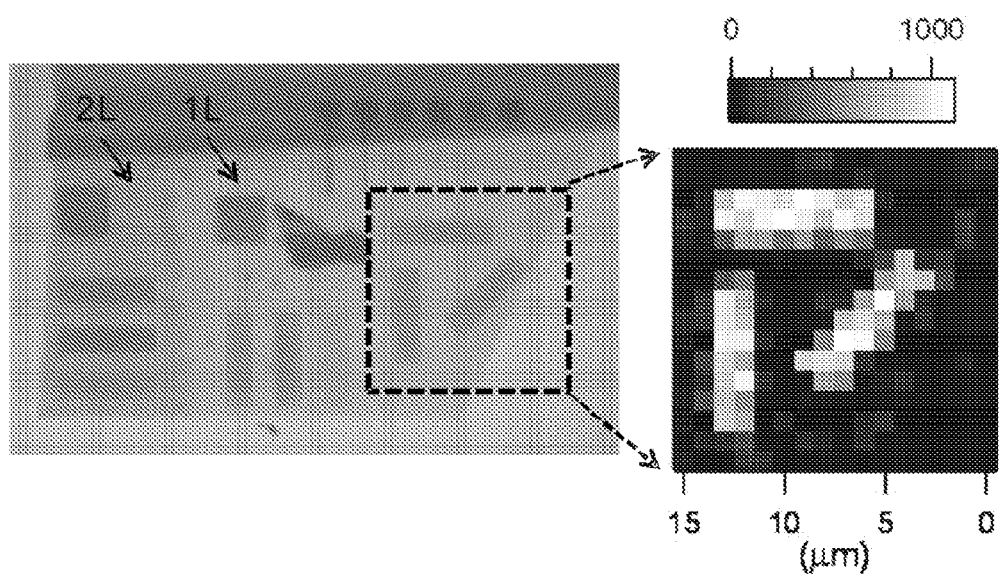
FIG. 5 depicts a micrograph of a graphene sample patterned with defects and a corresponding Raman Map according to some embodiments of the disclosed subject matter.

To form defects, a HSQ film of 20 nm thickness was spin-coated on graphene, and was then irradiated by 30 keV electrons (dosage=1 mC/cm$^2$). FIG. 4 depicts a Raman Spectrum of an area of a single layer graphene containing defects formed by the above method. Similar to the Raman spectrum shown in Examples 1 and 2, this Raman spectrum also shows a prominent defect-derived band near 1350 cm$^{-1}$ (the peak enclosed by the dotted line and denoted D), indicating a disruption of the ideal graphitic order. FIG. 5 left panel shows an optical migrograph of a graphene flake patterned by the above method. Several geometrical patterns including rectangle and square shaped regions were obtained by scanning an electron beam over these areas. FIG. 5 right panel depicts a D band Raman intensity map obtained by raster-scanning a 10×10 micron$^2$ area of the graphene flake (shown in the left panel). The Raman intensity map demonstrates that the disclosed methods can pattern graphitic materials with controlled levels of defects.

For comparison, two stacked graphene layers (2 L, as indicated in the left panel of FIG. 5, the section to the left of the dotted line) were employed and similar procedures as above were used for forming defects. It was found that at the same dosage of e-beam, 2 L graphenes are less reactive than the single layer (1 L) graphene. This indicates that 1 L graphene can have more degree of freedom than 2 L graphenes. Only when a much higher dosage, e.g., about 4 mC/cm$^2$ or greater, of e-beam was used did the D band indicating defects on 2 L graphenes become prominent.

To cure the defects on the single layer graphene, the areas of graphene containing the defects were irradiated with 514 nm laser light of 300 kW/cm$^2$ power density for forty minutes. The solid line in FIG. 4 shows the effect of the repair: the defect-derived Raman peak was decreased by 80% (as indicated by the small peak near 1350 cm$^{-1}$ enclosed by the solid line) by the light-induced curing process.

Example 4

Example 4 illustrates the influence of the irradiation-induced effects on the electrical properties of graphene.

Figure 6:
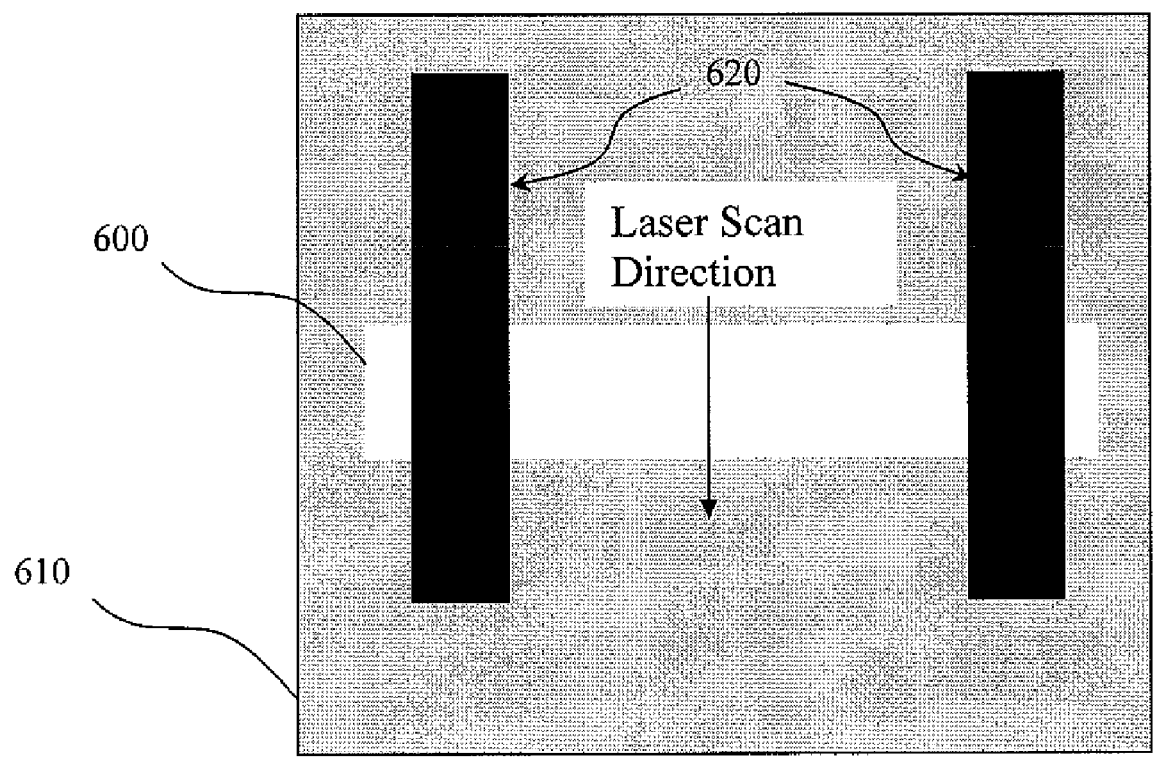
FIG. 6 is a schematic representation of a device according to some embodiments of the disclosed subject matter.

To probe the change of electrical properties of graphene, a graphene field effect transistor was first fabricated by standard lithography techniques. The schematics of the device are shown in FIG. 6 (top view).

A single layer of graphene 600 was prepared by mechanical exfoliation of graphite onto an approximately 1 cm$^2$ highly doped Si wafer 610 (the wafer has about 300 nm SiO$_2$ layer on its top surface). Source and drain electrodes 620, each of the electrodes having a width of about 2 microns, were patterned onto the single layer graphene using electron beam lithography. The electrodes each consisted of chromium and gold, with chromium serving as an adhesion layer (i.e., chromium being in contact with the Si wafer surface). The Si wafer was used as the back gate. Electrical properties of the device were measured using a probe station and a semiconductor analyzer. After the measurement, the graphene device was immersed in benzoyl peroxide solution in toluene.

A commercial microscope Nikon Eclipse TE300 was used to focus a 514 nm laser beam onto the graphene to introduce defects. The laser was scanned on the graphene between the source and drain electrodes in the direction as shown in FIG. 6. The formation of defects was confirmed by Raman spectroscopy. The electrical properties of the device were measured again after the formation of defects.

Figure 7:
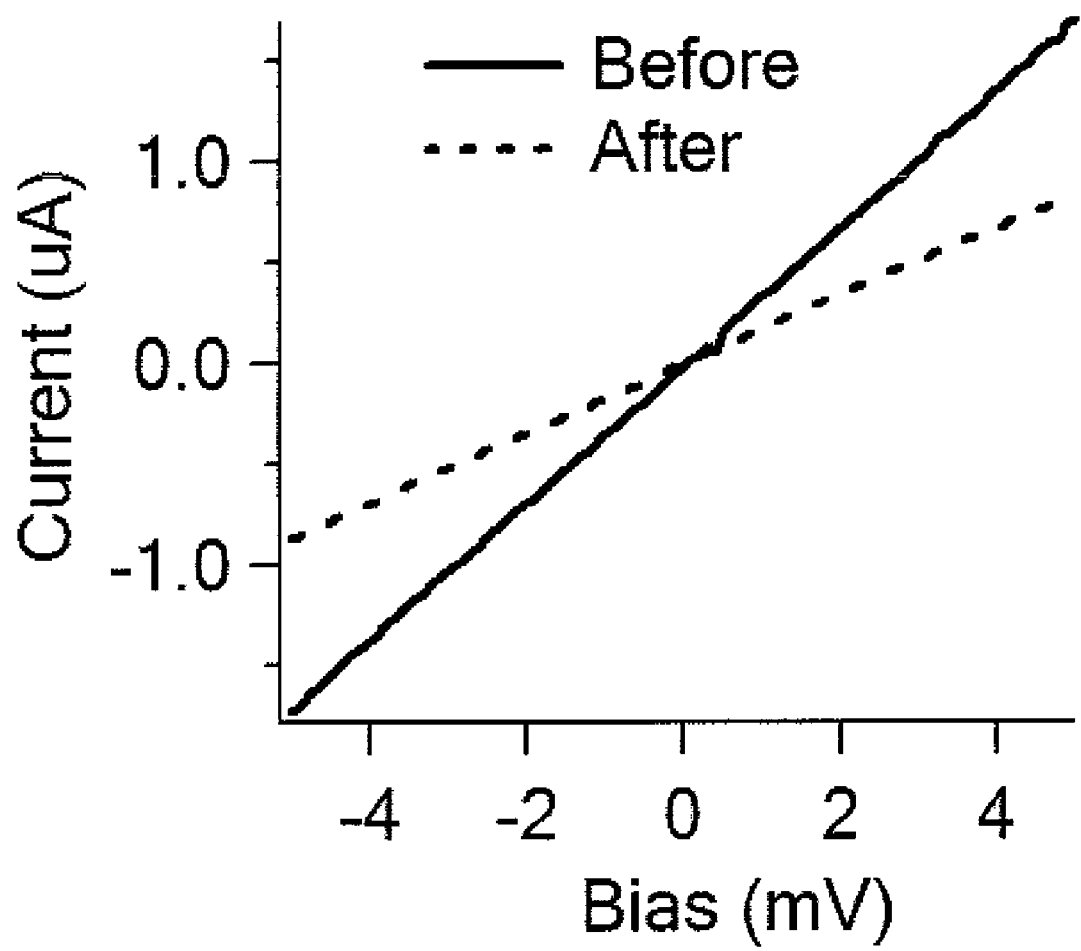
FIG. 7 depicts a diagram comparing an electric property of graphene before and after defects formation according to some embodiments of the disclosed subject matter.
Figure 8:
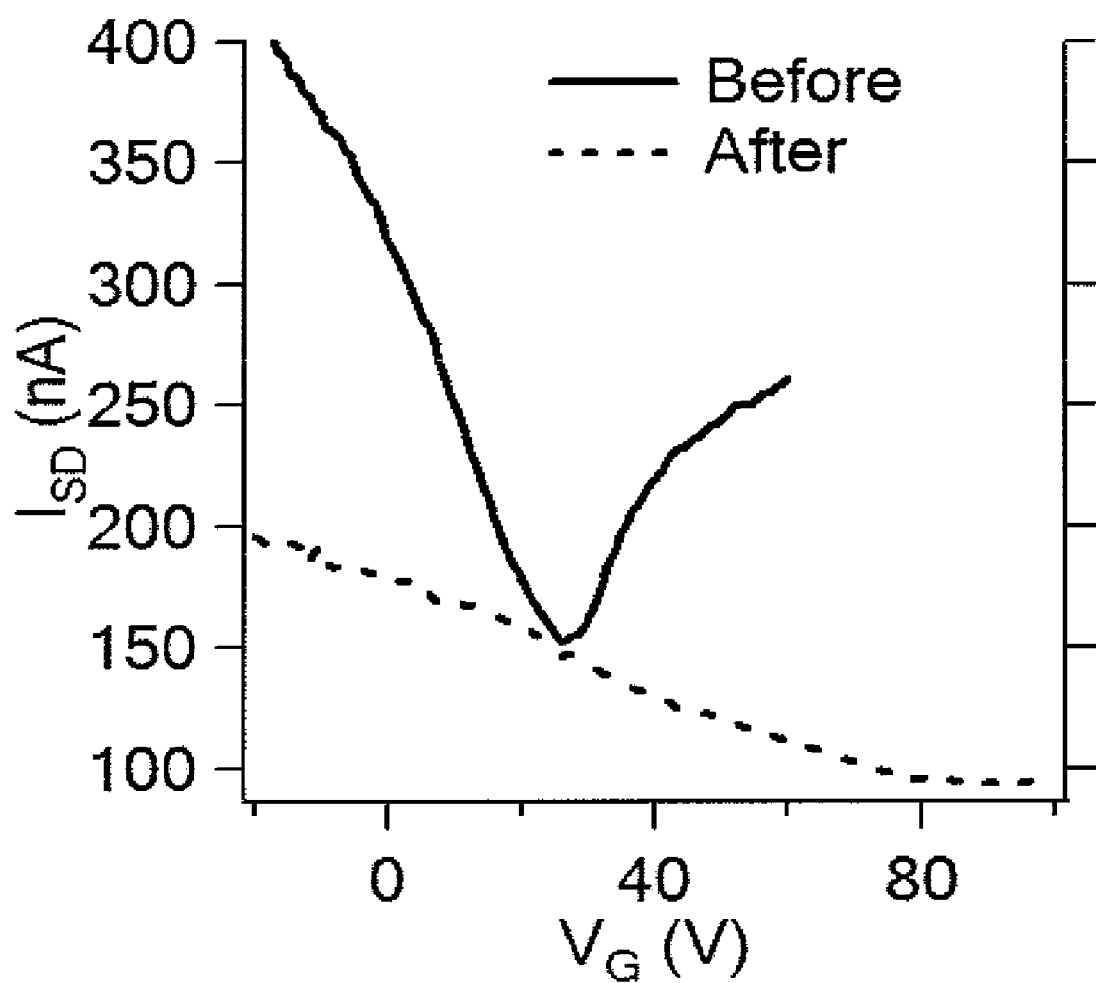
FIG. 8 depicts a diagram comparing an electric property of graphene before and after defects formation according to some embodiments of the disclosed subject matter.

FIGS. 7 and 8 compare the electrical characteristics of the device before and after the defects formation. FIG. 7 depicts the drain current as a function of source drain bias, which shows that the conductance of graphene greatly decreased after the formation of defects. FIG. 8 depicts the drain current as a function of back gate voltage (the source-drain bias was kept at 1 mV), which indicates that the graphene became highly hole doped after the formation of defects.

The foregoing merely illustrates the principles of the disclosed subject matter. Various modifications and alterations to the described embodiments will be apparent to those skilled in the art in view of the teachings herein. It will be appreciated that those skilled in the art will be able to devise numerous modifications which, although not explicitly described herein, embody the principles of the disclosed subject matter and are thus within the spirit and scope of the disclosed subject matter.

What is claimed is:

1. A method of forming defects on a graphitic material, comprising:
    applying a radiation reactive material to at least a portion of a surface of said graphitic material,
    irradiating said radiation reactive material to produce a reactive species therein, and
    permitting said reactive species to react with at least said portion of said surface of said graphitic material to thereby form at least one defect therein,
    wherein said radiation reactive material comprises a molecule selected from the group consisting of a diatomic halogen molecule, hydrogen silsesquioxane, poly(methyl methacrylate), and a peroxide compound.

2. The method of claim 1, wherein said irradiating comprises electromagnetic radiation having a wavelength in the range of 200 to 1500 nm.

3. The method of claim 1, wherein said irradiating comprises one or more electron beams.

4. The method of claim 1, wherein said graphitic material comprises graphene.

5. The method of claim 1, wherein said graphitic material comprises multiple layers of stacked graphene.

6. The method of claim 1, wherein said radiation reactive material comprises a diatomic halogen molecule.

7. The method of claim 6, wherein the diatomic halogen molecule is selected from the group consisting of fluorine, bromine, chlorine, and iodine.

8. The method of claim 1, wherein said radiation reactive material comprises poly(methyl methacrylate).

9. The method of claim 1, wherein said radiation reactive material comprises hydrogen silsesquioxane.

10. The method of claim 1, wherein said radiation reactive material comprises a peroxide compound.

11. The method of claim 10, wherein said peroxide compound comprises benzoyl peroxide.

12. The method of claim 1, wherein said applying comprises applying by spin-coating.

13. The method of claim 1, wherein said applying comprises applying a gas form by adsorption onto said surface of said graphitic material.

14. The method of claim 1, wherein said reactive species comprises a radical.

15. A method of forming defects on a graphitic material, comprising:
    applying a radiation reactive material to at least a portion of a surface of said graphitic material,
    irradiating said radiation reactive material using one or more electron beams to produce a reactive species therein, and
    permitting said reactive species to react with at least said portion of said surface of said graphitic material to thereby form at least one defect therein,
    the method further comprising irradiating a second portion of said radiation reactive material so as to produce a plurality of defects on said surface of said graphitic material, the plurality of defects forming a geometric pattern, at least a section of which having a resolution of approximately 15 nm.

16. A device incorporating a hole-doped graphene comprising one or more areas having a first conductance and one or more areas having a second conductance, wherein the first conductance is lower than the second conductance.

17. The device of claim 16, wherein said device is a field effect transistor.

18. The device of claim 17, wherein said field effect transistor comprises a first electrode comprising a metal, a second electrode comprising a metal and separated from the first electrode, and a channel connecting the first electrode and the second electrode, the channel comprising said hole-doped graphene.

19. The device of claim 16, wherein said one or more areas having said first conductance of said hole-doped graphene comprise one or defects formed by the method comprising:
    applying a radiation reactive material to at least a portion of a surface of said graphene,
    irradiating said radiation reactive material to produce a reactive species therein, and
    permitting said reactive species to react with at least said portion of said surface of said graphene to thereby form at least one defect therein.

* * * * *

UNITED STATES PATENT AND TRADEMARK OFFICE
CERTIFICATE OF CORRECTION

PATENT NO. : 8,273,525 B2
APPLICATION NO. : 12/770242
DATED : September 25, 2012
INVENTOR(S) : Sunmin Ryu et al.

Page 1 of 1

It is certified that error appears in the above-identified patent and that said Letters Patent is hereby corrected as shown below:

In the Specifications:

Column 1, lines 16-22:
STATEMENT REGARDING FEDERALLY SPONSORED RESEARCH
The disclosed subject matter was made with government support under Grant No. DE-FG02-98ER14861, awarded by the Department of Energy. The government has certain rights in the disclosed subject matter.

should read

--STATEMENT REGARDING FEDERALLY SPONSORED RESEARCH OR DEVELOPMENT
This invention was made with government support under grant numbers DE-FG02-98ER14861 awarded by the Department of Energy and 0641523 awarded by the National Science Foundation. The government has certain rights in the invention.--

Signed and Sealed this
Fourteenth Day of May, 2013

Teresa Stanek Rea
*Acting Director of the United States Patent and Trademark Office*